United States Patent
Cheah et al.

(10) Patent No.: US 7,236,758 B1
(45) Date of Patent: Jun. 26, 2007

(54) INTEGRATED WIRELESS MULTIMEDIA INTEGRATED CIRCUIT

(75) Inventors: Jonathon Cheah, San Diego, CA (US); John Kwok, Hong Kong (HK)

(73) Assignee: Femto Devices, Inc., San Diego, CA (US)

( * ) Notice: Subject to any disclaimer, the term of this patent is extended or adjusted under 35 U.S.C. 154(b) by 475 days.

(21) Appl. No.: 10/360,481

(22) Filed: Feb. 7, 2003

(51) Int. Cl.
  *H04B 1/06* (2006.01)
  *H04B 1/28* (2006.01)

(52) U.S. Cl. .................. 455/252.1; 348/723; 348/724; 348/725; 348/726; 725/151; 455/73; 455/74; 455/76; 455/77; 455/78; 455/333

(58) Field of Classification Search .................. 455/76; 348/725–6, 731
See application file for complete search history.

(56) References Cited

U.S. PATENT DOCUMENTS

| | | | | |
|---|---|---|---|---|
| 5,012,350 A | * | 4/1991 | Streck et al. ................. | 386/96 |
| 5,068,918 A | * | 11/1991 | Verheijen et al. ........... | 455/142 |
| 5,336,947 A | * | 8/1994 | Lehning ....................... | 327/18 |
| 5,374,904 A | * | 12/1994 | Ishibashi ..................... | 331/17 |
| 5,481,257 A | * | 1/1996 | Brubaker et al. ....... | 340/825.69 |
| 5,701,595 A | * | 12/1997 | Green, Jr. ................... | 455/83 |
| 6,091,931 A | * | 7/2000 | Ben-Efraim et al. ....... | 455/3.02 |
| 6,177,964 B1 | * | 1/2001 | Birleson et al. ............ | 348/725 |
| 6,434,187 B1 | * | 8/2002 | Beard et al. ................ | 375/219 |
| 6,888,580 B2 | * | 5/2005 | Dujmenovic ................ | 348/731 |
| 2001/0041548 A1 | * | 11/2001 | Bult et al. ............... | 455/252.1 |
| 2002/0150147 A1 | * | 10/2002 | Liang .......................... | 375/133 |
| 2004/0207718 A1 | * | 10/2004 | Boyden et al. .......... | 348/14.01 |

FOREIGN PATENT DOCUMENTS

JP    3-214881    * 9/1991

* cited by examiner

*Primary Examiner*—Quochien B. Vuong
*Assistant Examiner*—Zhiyu Lu
(74) *Attorney, Agent, or Firm*—Blakely, Sokoloff, Taylor & Zafman, LLP

(57) ABSTRACT

An integrated circuit having a transmit chain configured to provide direct FM modulation of a voltage controlled oscillator of a frequency synthesizer by a composite signal that includes audio and video components, and a receive chain configured to provide a television compatible modulated signal having audio and video information. The receive chain can display locally transmitted signals.

16 Claims, 3 Drawing Sheets

INTEGRATED WIRELESS MULTIMEDIA INTEGRATED CIRCUIT

FIELD OF THE INVENTION

The present invention provides an integrated circuit that enables wireless connectivity for base band video, audio and data information streams directly among like devices. The present integrated circuit may be deployed in receive-only, transmit-only or transmit and receive terminal applications.

BACKGROUND

Low cost, high volume wireless communication solutions are needed to provide wireless connectivity in a variety of applications. For example, short-range wireless communications make use of Bluetooth communication components. Although such components were originally developed as multiple integrated circuit "chip sets", several "single chip" Bluetooth solutions have been introduced to the market by various vendors. For longer-range wireless communications, chip sets implementing the so-called Wi-Fi or IEEE 802.11b communication protocol are available. Newer IEEE 802.11a and IEEE 802.11g solutions have also recently come to market. Most, if not all, of these integrated circuits (ICs) make use of complementary metal oxide semiconductor (CMOS) materials and fabrication technology in order to keep the cost of the ICs to a minimum, Although there has been much growth in the wireless communication market in recent years, to date no single IC has been made available that combines facilities for video, audio and data transmissions over the unlicensed radio spectrum bands allowed by regulatory authorities. Nevertheless, such ICs are needed for allowing manufacturers of audio/video equipment and the like to further reduce the costs associated with wireless communication to/from such devices. Accordingly, there exists a need for such an IC, which need is addressed by the present invention.

SUMMARY OF THE INVENTION

In one embodiment, the present invention provides an integrated circuit having a transmit chain configured to provide direct FM modulation of a voltage controlled oscillator of a frequency synthesizer by a composite signal that includes data, audio and video components, and a receive chain configured to provide a television compatible signal having audio and video information as well as data. The receive chain includes a low noise amplifier coupled to receive an input RF signal that includes the data, audio and video information, a mixer configured to down convert the RF signal to an intermediate frequency (IF) signal, and an IF stage configured to extract from a filtered version of the IF signal the audio and video information. The video information is extracted from the IF signal using a video discriminator, while the audio and data information is extracted from the IF signal using an audio detector through the video discriminator FM subcarrier. In addition to the TV compatible signal, the receive chain is further configured to provide base band data, audio and video outputs.

BRIEF DESCRIPTION OF THE DRAWINGS

The present invention is illustrated by way of example, and not limitation, in the figures of the accompanying drawings in which.

DETAILED DESCRIPTION

Described herein is an integrated IC, which may be fabricated in CMOS using conventional semiconductor manufacturing techniques, and which enables wireless connectivity for base band raw analog video, audio and data information streams directly among like devices. The integrated IC allows audio signals and digital data to be FM sub-carrier modulated and combined with FM modulated raw video signals. These combined signals are then up-converted in frequency so that wireless transmission can take place. The integrated IC also provides a complete receive chain in which recovered video and audio signals are converted to a standard (e.g., NTSC or PAL) television signal format (via a television signal modulator embedded in this IC) for reproduction over selected television channels (such as channels 3 and/or 4) commonly used in the industry for modulated video devices. Notably, the television signal modulator may also be used in the transmit path so that the video and audio signals being transmitted may be viewed and/or heard by the sender on a television receiver. By fabricating the IC in CMOS, manufacturing costs are minimized and transmission may be had with minimal DC power requirements.

Figure 1:
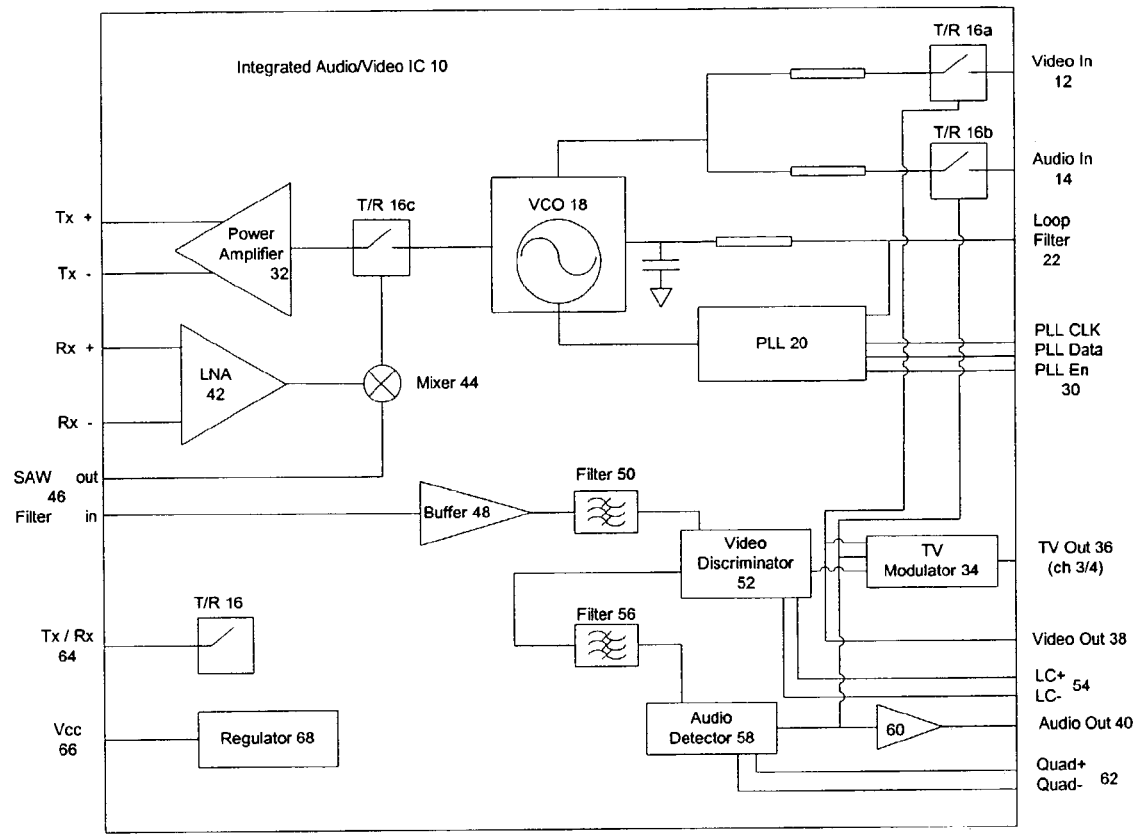
FIG. 1 illustrates a block diagram of major components of an integrated circuit configured in accordance with one embodiment of the present invention.

Referring now to FIG. 1, a functional block diagram showing major components of an integrated audio/video IC 10 configured in accordance with one embodiment of the present invention is shown. The transmit path starts with a video input 12 and an audio input 14. Each of these inputs is coupled to a transmit/receive (T/R) switch 16a and 16b, which is used to decouple the IC 10 from inputs during receive operations. The audio inputs include integrated audio and data signals modulated on an FM sub-carrier using conventional techniques. In one embodiment, the audio and the data signals are modulated on an FM sub-carrier at 6.5 or 5.5 MHz, though other frequencies may be used in other embodiments. The video input consists of a raw video signal in a format of choice in base band The choice is determined by the format of the target TV receiver. For example, if an NTSC TV receiver is the receiver of choice, then the raw video format used shall be compatible with NTSC, the same would apply to all existing TV formats such as SECAM or PAL or others.

From the T/R switches 16a and 16b, the audio and video inputs are combined, and the resulting composite signal acts as a modulating analog signal that directly modulates (FM modulation) a voltage controlled oscillator (VCO) 18 of a frequency synthesizer. A frequency synthesizer is a device that produces frequencies that are phase coherent with a reference frequency (as may be provided by a crystal, etc.). In this case the frequency synthesizer makes use of an internal phase locked loop (PLL) 20 and an external loop filter. The choice of the loop filter is such that the low pass function of PLL 20 is narrower in bandwidth so that the resultant FM signal is not impaired significantly. The external loop filter elements permit the user of this IC to determine the suitable bandwidth to apply. Wider filter bandwidths allows the PLL 20 to lock faster, but also tend to degrade the desired FM signal. The modulated FM signal through the VCO 18 has a high pass function, consequently any signal higher than the PLL loop filter bandwidth will not be affected.

Figure 2:
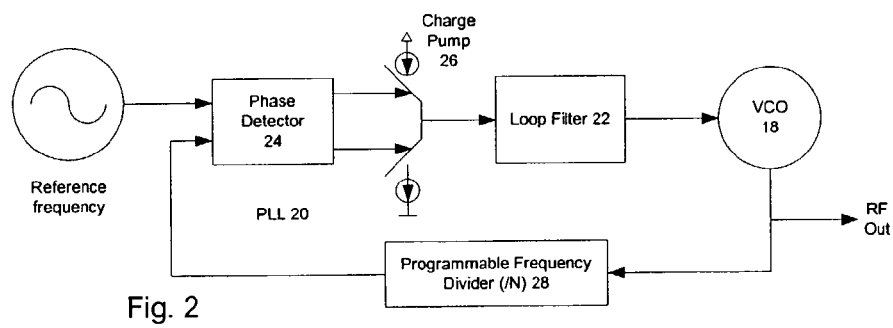
FIG. 2 illustrates a block diagram of a phase locked loop-based frequency synthesizer suitable for use in an embodiment of the present invention.

As shown in FIG. 2, the loop filter 22 (which may be a conventional RC filter) is located electrically between the phase detector 24 of the PLL 20 and the VCO 18. The frequency detector 24 detects errors in the frequency generated by VCO 18 and transmits signals to a charge pump 26 to raise or lower the VCO frequency accordingly. PLL 20 is thus an electronic circuit that controls VCO 18 so that it maintains a constant (or nearly constant) phase angle relative to the reference signal. The circuit details of the PLL 20, VCO 18 and loop filter are not critical to the present invention inasmuch as many conventional circuits for such applications exist (e.g., as portions of CMOS fabrication cell libraries) and to the extent possible such conventional circuits will be used during fabrication of IC 10 in order to minimize design costs.

The output frequency of the frequency synthesizer may be set using a programmable frequency divider 28 (conventional integer-N architecture) in the feedback path to the frequency detector 24 of PLL 20. As shown in FIG. 1, the frequency divider may be programmed using a conventional 3-wire bus (clock, data and enable (read/write)) 30. Alternatively in some embodiments an I$^2$C bus may be used.

Because direct FM modulation is used, the VCO 18 is set at the transmit frequency. Specifically, in one embodiment of the present invention a transmit frequency in the ISM (2.4 GHz) band is used, and during transmit operations the VCO 18 will cover the range of 2.4000 GHz to 2.4835 GHz. In this embodiment, the FM modulation deviation bandwidth for the composite (video plus audio and data) signal is 20 MHz wide.

The output of the VCO 18 is provided via a further T/R switch 16c to a power amplifier 32. A conventional two-stage class AB amplifier may be used, although other amplifier configurations may also be utilized. Since the FM signal is very robust against non-linearity in the passband of the transmitter, non-linear amplification such as Class C amplification or others may also be used. The differential outputs of the power amplifier 32 may be provided to an antenna, in some cases through a balun.

As shown, the base band audio and video signals are also made available to a TV modulator 34, which provides a television displayable signal (TV out 36) in channel 3 and/or 4. Thus, the transmitted signal is viewable on a television receiver associated with the transmitting station, is so desired. Such modulators are well known in the art. The base band signals themselves may also be provided as outputs at a video out port 38 and audio out port 40. Note, the audio out port will provide the audio and digital data signals modulated on the FM sub-carrier.

On the receive side, the frequency synthesizer VCO 18 is switched to a 480 MHz offset, so that specifically in the example of the ISM (2.4 GHz) band device the VCO frequency range will be 1.9200 GHz to 2.0035 GHz. A composite signal is received via a low noise amplifier (LNA) 42 and the amplified RF composite signal is down-converted at mixer 44 to an intermediate frequency (IF). The IF signal is then filtered by an external filter, such as a surface acoustic wave (SAW) filter, coupled to the filter in/out ports 46. Filters of this type are commonly used in wireless applications, such as Bluetooth RF ICs, for channel filtering.

The resulting filtered signal is buffered at IF amplifier 48 and filtered at bandpass filter 50. From the filter 50, the IF signal is provided to a video discriminator 52, which acts as an FM demodulator at 480 MHz and filters the video signal component from the composite signal. The video component of the signal is then provided to the TV modulator 34, which produces the TV compatible signal at output port 36. In addition to this TV compatible signal, the raw video signal is also provided at port 38. The LC+ and LC− ports 54 provide the user of this IC with the video discriminator oscillator frequency control by providing the resonant frequency LC elements.

The output of the 480 MHz FM demodulator is also applied as an input to filter 56 which demodulates the audio and data signals from the FM sub-carrier. The recovered audio and data signals are processed by audio detector 58. The recovered audio signal is provided to the TV modulator 34 to accompany the video signal and is also amplified at amplifier 60 and made available to the audio out port 40. The recovered data signal is processed such that the output is made available to the same audio out port 40. The external pins Quad+ and Quad− 62 provide the quadrature tank element connections, so that user of this IC can determine the necessary quadrature tank response needed.

The integrated IC 10 also includes a T/R input port 64, which is configured to receive an external transmit/receive signal (e.g., from an external controller) and provide it to the internal T/R switches 16. Power is provided via Vcc port 66 and an on-board regulator 68 acts to distribute power to the various on-chip circuitry.

Figure 3:
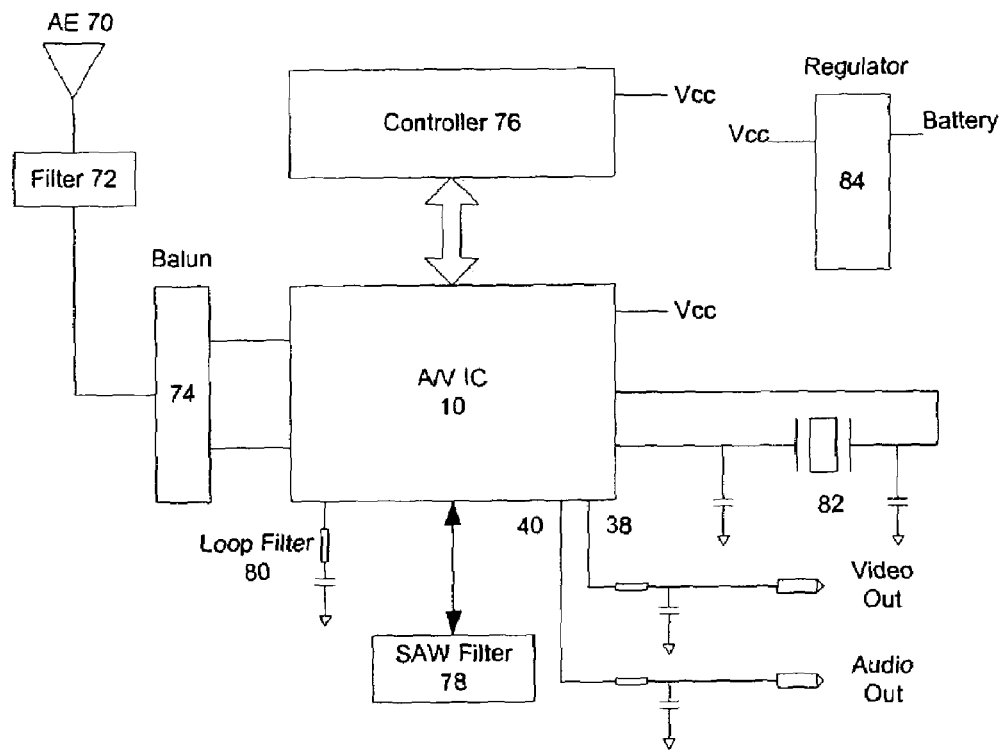
FIG. 3 illustrates one example of an integrated circuit configured in accordance with one embodiment of the present invention deployed in a receive-only terminal application.

FIG. 3 illustrates an example of the integrated IC 10 used in a receive-only configuration. In such applications, the IC 10 is coupled to receive signals from an antenna 70. Preferably, a line filter 72 and balun 74 are used to provide proper impedance matching between the antenna 70 and the IC 10. By way of example, a 2.4 GHZ receive filter 72 such as the MDR746 available from SOSHIN may be used. The balun 74 may be a conventional balun as is used in Bluetooth wireless applications. In some cases, filter 72 and balun 74 will be included in a single package.

The PLL has its internal channel selection circuit so that a fixed 4-channel capability is built in with ability to provide hardwired channel selection externally. The PLL channel selection operations of IC 10 can be also selected to be under the control of an external controller 76. In one embodiment, a Samsung S3c1860 4-bit, single chip CMOS microcontroller is used. This microcontroller includes a CPU as well as on-chip ROM and RAM. Control signals passed from controller 76 to IC 10 include the T/R signal as well as the 3-wire bus programming signals for PLL 20.

A SAW filter 78 is provided externally to IC 10 and may be coupled to the output/input ports 46 of IC 10. In addition, loop filter 80 is provided. The crystal 82 provides the reference frequency (e.g., 4 MHz) for the frequency synthesizer, as discussed above. External regulator 84 provides Vcc operating voltage to the IC 10 and controller 76. In one embodiment, an XC6201 voltage regulator from Blue Sky Electronics may be used.

Figure 4:
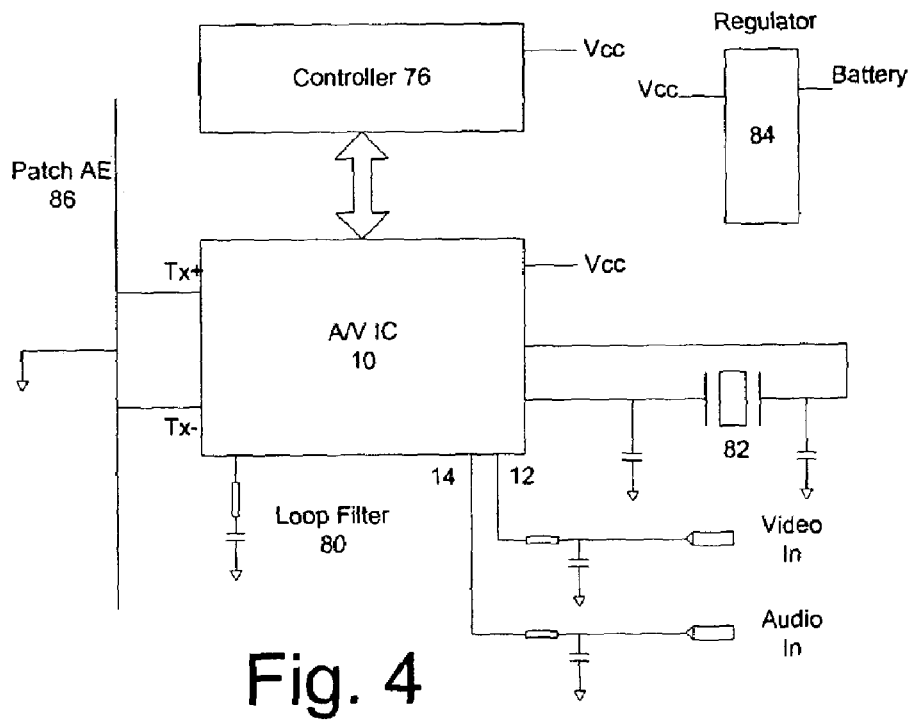
FIG. 4 illustrates one example of an integrated circuit configured in accordance with one embodiment of the present invention deployed in a transmit-only terminal application.

FIG. 4 illustrates an example of a transmit only configuration for IC 10. The configuration is very similar to that described above with reference to FIG. 3, with the exception that a SAW filter is not required since the receive path of the IC 10 is not used. Also, a balun is not needed if a patch antenna 86 is employed. The patch antenna 86 consists of a conductive member to which the IC 10 is connected perpendicularly. A ground port is also connected perpendicularly to the conductive member. The patch antenna may be printed on a PC board which is also used to mount the other components of the transmit only configuration.

Figure 5:
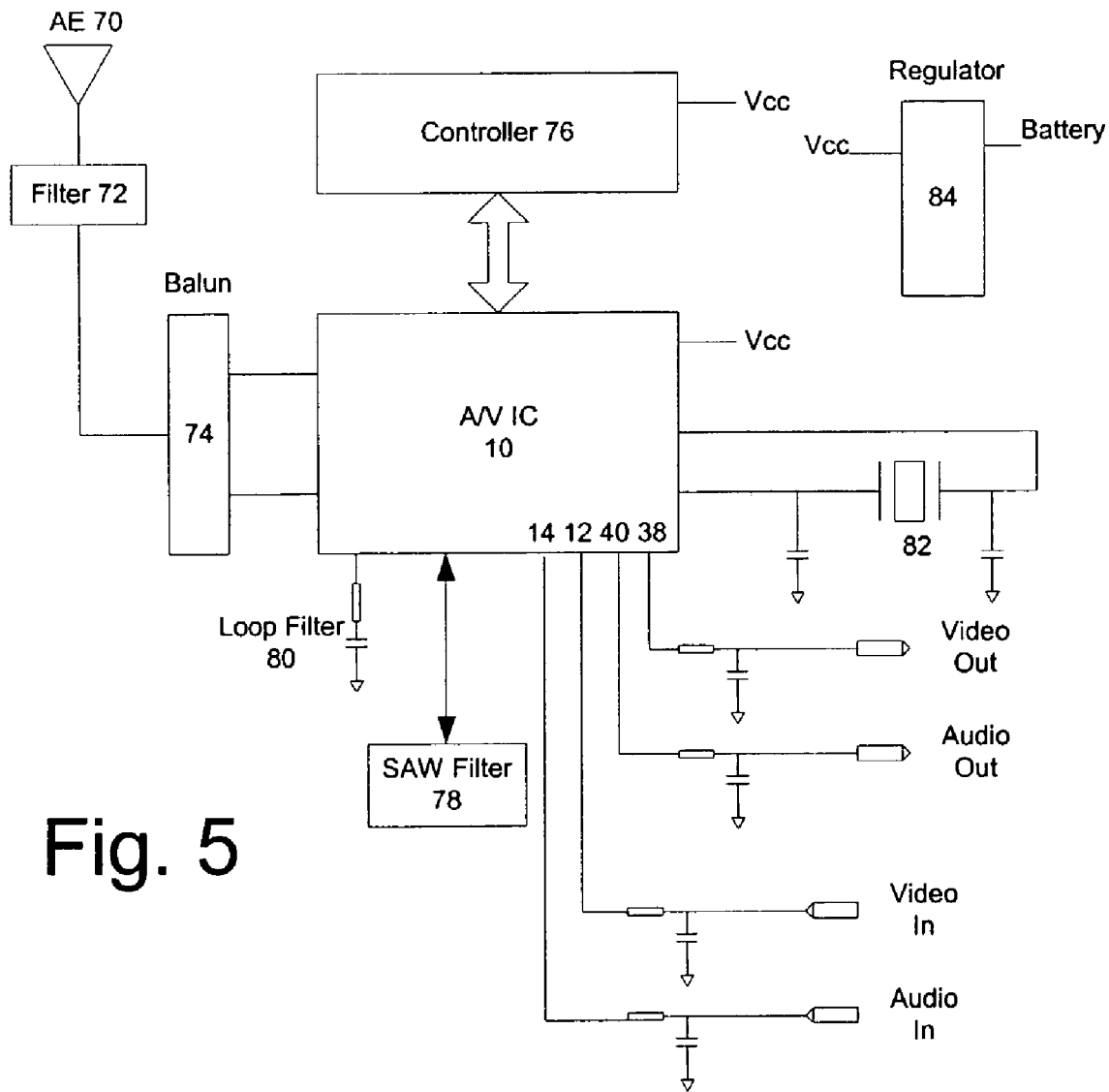
FIG. 5 illustrates one example of an integrated circuit configured in accordance with one embodiment of the present invention deployed in a half duplex transceiver terminal application.

FIG. 5 illustrates a half-duplex transceiver configuration for IC 10. This configuration essentially incorporates the features of the receive only and transmit only configurations discussed above. Half duplex operations are under the control of controller 76, which may be programmed accordingly. Half duplex operation can also be controlled externally, so that effective video, audio and data "push to talk" operation can be achieved.

Thus, an integrated audio/video IC for wireless applications has been described. Although discussed with respect to various illustrated embodiments, however, the present invention should be measured only in terms of the following claims.

What is claimed is:

1. An integrated circuit (IC), comprising:
   a transmit chain configured to provide direct FM modulation of a composite signal that includes audio and video components, the transmit chain including
      a video input port to receive a video signal having a base band frequency, the video signal representing the video component of the composite signal,
      an audio input port to receive an audio signal, the audio signal representing the audio component of the composite signal,
      a frequency synthesizer coupled to the video and audio input ports to perform FM modulation of the audio and video signals to generate a radio frequency (RF) signal, wherein the frequency synthesizer comprises:
         a voltage controlled oscillator (VCO) to generate a signal in an RF frequency band, and
         a phase-locked-loop (PLL) to control the VCO, the PLL including
            a reference frequency source to provide a reference frequency signal,
            a programmable frequency divider coupled to the VCO,
            a phase detector coupled to and the reference frequency source to detect an error a frequency of the signal generated from the VCO and received via the programmable frequency divider, in view of a reference frequency of the reference frequency signal, and
            a charge pump coupled to the phase detector and the VCO, wherein the charge pump is configured to raise or lower an output frequency of the VCO based on a signal representing the error between the output frequency of the VCO and the reference frequency of the reference frequency signal,
      a power amplifier coupled to the frequency synthesizer to amplify the RF signal, generating an amplifier RF signal,
      a RF output port coupled to the power amplifier allow the amplified RF signal to be transmitted over an RF transmission media external to the IC,
      a first switch coupled to the video input port and the frequency synthesizer, and
      a second switch coupled to the audio input port and the frequency synthesizer,
      wherein the first and second switches are configured to isolate the frequency synthesizer from the video input port and the audio input port respectively during a receiving operation of the receive chain, and
      wherein the first and second switches are configured to couple the video input port and the audio input port to the frequency synthesizer respectively during a transmitting operation of the transmit chain; and
   a receive chain coupled to the transmit chain to provide a television (TV) compatible signal having audio and video information in response to an input RF signal received externally, wherein the TV compatible signal is suitable to be used by a TV compatible device, the receive chain including
      a RF input port to receive the input RF signal having a radio frequency from a source external to the IC,
      a low noise amplifier (LNA) coupled to the RF input port to amplify the received input RF signal,
      a frequency mixer coupled to the LNA and the frequency synthesizer of the transmit chain, the frequency mixer down-converting the amplified input RF signal into an IF (intermediate frequency) signal using at least a portion of the frequency synthesizer of the transmit chain, a third switch coupled to the power amplifier, the frequency synthesizer, and the frequency mixer together, wherein the first, second, and third switches are controlled by an external transmit/receive command signal,
      a TV modulator coupled to the frequency mixer to perform TV modulation on the IF signal, generating the TV compatible signal,
      a TV output port coupled to the TV modulator to provide the TV compatible signal to the TV compatible device external to the IC,
      an IF amplifier coupled to an output of the mixer, the IF amplifier receiving the IF signal from the mixer to amplify the IF signal,
      a first filter coupled to an output of the IF amplifier, the first filter being a band-pass filter to perform a band-pass filtering operation on the amplified IF signal,
      a video discriminator coupled to an output of the first filter and a first input of the TV modulator, wherein the video discriminator is configured to perform FM demodulation based on the filtered IF signal to generate a video component of a composite signal to be used by the TV modulator, wherein the TV modulator coupled to the first switch and a video output port
      a second filter coupled to an output of the video discriminator to extract an audio signal and a data signal from an output signal of the video discriminator,
      an audio detector coupled to an output of the second filter and a second input of the TV modulator to process the extracted audio and data signals, wherein the audio detector is configured to transmit the processed audio signal to the TV modulator to accompany the video signal processed by the TV modulator in order to generate the TV compatible signal, and
      an audio output port coupled to an output of the audio detector to output the audio signal generated from the audio detector, the output audio signal being suitable to be played by an audio player external to the IC, wherein the audio output port coupled to the second switch wherein the transmit chain and the receive chain are integrated within a single chipset.

2. The integrated circuit of claim 1 wherein the receive chain further comprises:
   a video output port coupled to the first switch to allow the video signal received from the video input port to be output to a video player external to the IC; and
   an audio amplifier coupled between the audio detector and the audio output port, the audio amplifier having an input coupled to an output of the audio detector and the second switch, the audio amplifier having an output coupled to the audio output port,
   wherein the audio amplifier is configured to route the audio signal received at the audio input port to the audio output port via the second switch.

3. The integrated circuit of claim 2 wherein the TV modulator further comprises:
   a video input coupled to the first switch to receive the video signal from the video input port; and
   an audio input coupled to the second switch to receive the audio signal from the audio input port, wherein the video signal and the audio signal are modulated by the TV modulator into a TV compatible signal suitable to be displayable by an external TV compatible device coupled to the TV output port.

4. An integrated circuit (IC), comprising:
   a transmit chain configured to provide direct FM modulation of a composite signal that includes audio and video components, the transmit chain including
      a video input port to receive a video signal having a base band frequency, the video signal representing the video component of the composite signal,
      an audio input port to receive an audio signal, the audio signal representing the audio component of the composite signal,
      a frequency synthesizer coupled to the video and audio input ports to perform FM modulation of the audio and video signals to generate a radio frequency (RF) signal, wherein the frequency synthesizer comprises:
         a voltage controlled oscillator (VCO) to generate a signal to an RF frequency band, and
         a phase-locked-loop (PLL) to control the VCO, the PLL including
            a reference frequency source to provide a reference frequency signal,
            a programmable frequency divider coupled to the VCO,
            a phase detector coupled to and the reference frequency source to detect an error a frequency of the signal generated from the VCO and received via the programmable frequency divider, in view of a reference frequency of the reference frequency signal, and
            a charge pump coupled to the phase detector and the VCO, wherein the charge pump is configured to raise or lower an output frequency of the VCO based on a signal representing the error between the output frequency of the VCO and the reference frequency of the reference frequency signal,
      a power amplifier coupled to the frequency synthesizer to amplify the RF signal, generating an amplifier RF signal,
      a RF output port coupled to the power amplifier allow the amplifier RF signal to be transmitted over an RF transmission media external to the IC; and a first switch coupled to the video input port and the frequency synthesizer, and a second switch coupled to the audio input port and the frequency synthesizer, wherein the first and second switches are configured to isolate the frequency synthesizer from the video input port and the audio input port respectively during a receiving operation of the receive chain, and wherein the first and second switches are configured to couple the video input port and the audio input port to the frequency synthesizer respectively during a transmitting operation of the transmit chain; and
   a receive chain coupled to the transmit chain to provide a television (TV) compatible signal having audio and video information in response to an input RF signal received externally, wherein the TV compatible signal is suitable to be used by a TV compatible device, the receive chain including
      a RF input port to receive the input RF signal having a radio frequency from a source external to the IC,
      a low noise amplifier (LNA) coupled to the RF input port to amplify the received input RF signal,
      a frequency mixer coupled to the LNA and the frequency synthesizer of the transmit chain, the frequency mixer down-converting the amplified input RF signal into an IF (intermediate frequency) signal using at least a portion of the frequency synthesizer of the transmit chain, a third switch coupled to the power amplifier, the frequency synthesizer, and the frequency mixer together, wherein the first, second, and third switches are controlled by an external transmit/receive command signal,
      a TV modulator coupled to the frequency mixer to perform TV modulation on the IF signal, generating the TV compatible signal,
      a TV output port coupled to the TV modulator to provide the TV compatible signal to the TV compatible device external to the IC,
      an IF amplifier coupled to an output of the mixer, the IF amplifier receiving the IF signal from the mixer to amplify the IF signal,
      a first filter coupled to an output of the IF amplifier, the first filter being a band-pass filter to perform a band-pass filtering operation on the amplified IF signal,
      a video discriminator coupled to an output of the first filter and a first input of the TV modulator, wherein the video discriminator is configured to perform FM demodulation based on the filtered IF signal to generate a video component of a composite signal to be used by the TV modulator, wherein the TV modulator coupled to the first switch and a video output port
      a second filter coupled to an output of the video discriminator to extract an audio signal and a data signal from an output signal of the video discriminator,
      an audio detector coupled to an output of the second filter and a second input of the TV modulator to process the extracted audio and data signals, wherein the audio detector is configured to transmit the processed audio signal to the TV modulator to accompany the video signal processed by the TV modulator in order to generate the TV compatible signal, and an audio output port coupled to an output of the audio detector to output the audio signal generated from the audio detector, the output audio signal being suitable to be played by an audio player external to the IC, wherein the audio output port coupled to the second switch wherein the transmit chain and the receive chain are integrated within a single chipset, a Quad+ pin and a Quad− pin coupled to the audio detector to provide external quadrature tank element connections external to the IC, such that a user of the IC can determine a necessary quadrature tank response as needed.

5. The integrated circuit of claim 4, further comprising an LC+ pin and an LC− pin coupled to the video discriminator to allow a user of the IC to provide external resonant frequency LC elements for controlling a discriminator oscillator frequency of the video discriminator.

6. The integrated circuit of claim 5, wherein the receive chain further comprises a SAW (surface acoustic wave) output pin and a SAW input pin to couple with an external SAW filter external to the IC, wherein an output of the mixer is coupled to the SAW output pin and an input of the IF amplifier is coupled to the SAW input pin, wherein the IF signal of the mixer is filtered by the external SAW filter coupled to the SAW input and output pins, and wherein the filtered IF signal is amplified by the IF amplifier.

7. The integrated circuit of claim 1, further comprising a third switch coupled to the VCO, the power amplifier, and the mixer, wherein the third switch is configured to couple an output of the VCO to an input of the power amplifier during a transmitting operation of the transmit chain, wherein the third switch is configured to couple the output of the VCO to an input of the mixer during a receiving operation of the receive chain.

8. The integrated circuit of claim 7, wherein the VCO is configured to generate a first frequency during a transmit operation of the transmit chain and a second frequency during a receive operation of the receive chain, and wherein the first frequency is approximately 480 MHz higher than the second frequency.

9. The integrated circuit of claim 8, wherein the first frequency is ranging approximately from 2.4000 to 2.4835 GHz, and wherein the second frequency is ranging approximately from 1.9200 to 2.0035 GHz.

10. The integrated circuit of claim 1, wherein the PLL further comprises a loop filter between an output of the charge pump and an input of the VCO, and wherein the loop filter is provided externally to the IC via a loop filter port of the IC, such that a user of the IC can adjust parameters of the loop filter specifically tailored to specific operations of the PLL.

11. The integrated circuit of claim 10, wherein the loop filter is selected such that a low-pass function of the PLL is narrower in bandwidth so that the generated signal is not impaired significantly.

12. The integrated circuit of claim 11, wherein the programmable frequency divider is programmable via a 3-wire bus having a clock wire to receive a clock signal, a data wire to receive a data signal, and an enable wire to enable certain functionality of the programmable frequency divider.

13. The integrated circuit of claim 12, further comprising a PLL CLK pin, a PLL Data pin, and a PLL Enable pin coupled to the programmable frequency divider and corresponding to the clock wire, data wire, and enable wire of the 3-wire bus, such that a user of the IC can provide external clock signal, data signal, and enable signal to program the programmable frequency divider.

14. The integrated circuit of claim 1, wherein the audio input port further receives an integrated signal integrated with the audio signal and a data signal which are modulated on an FM sub-carrier.

15. The integrated circuit of claim 14, wherein the audio signal and the data signal are modulated by the FM sub-carrier at a frequency ranging approximately from 5.5 to 6.5 MHz.

16. The integrated circuit of claim 15, wherein the TV output port is configured to provide a TV compatible signal displayable via at least one of channel 3 and channel 4 of a TV compatible device.

* * * * *